United States Patent [19]

Hartman

[11] Patent Number: 4,487,854

[45] Date of Patent: Dec. 11, 1984

[54] POLYOXYALKYLENE POLYETHER POLYOLS AND POLYURETHANE FOAMS PREPARED THEREFROM

[75] Inventor: Robert J. Hartman, Southgate, Mich.

[73] Assignee: BASF Wyandotte Corporation, Wyandotte, Mich.

[21] Appl. No.: 565,311

[22] Filed: Dec. 27, 1983

[51] Int. Cl.³ .................... C08G 18/14; C08G 18/32
[52] U.S. Cl. .................................. 521/174; 521/175; 521/914; 568/867
[58] Field of Search .................... 521/914, 174, 175; 568/867

[56] References Cited

U.S. PATENT DOCUMENTS

| | | | |
|---|---|---|---|
| 3,535,307 | 10/1970 | Moss et al. | 521/914 |
| 3,887,505 | 6/1975 | Demou | 521/914 |
| 4,144,386 | 3/1979 | Consoli et al. | 521/914 |
| 4,266,043 | 5/1981 | Fujii et al. | 521/914 |

*Primary Examiner*—Herbert S. Cockeram
*Attorney, Agent, or Firm*—Norbert M. Lisicki

[57] ABSTRACT

The invention relates to polyols prepared by reacting ethylene oxide with an initiator followed by additional alkylene oxide. The ethylene oxide blocks at the initiator ranges from 1 to 30 weight percent based on the weight of the polyol. Polyurethane foams prepared from these polyols exhibit good air flow and improved load bearing properties.

9 Claims, No Drawings

POLYOXYALKYLENE POLYETHER POLYOLS AND POLYURETHANE FOAMS PREPARED THEREFROM

BACKGROUND OF THE INVENTION

1. Field of the Invention

The invention relates to a process for the preparation of polyoxyalkylene polyether polyols, the products of the process and the polyurethane foams prepared therefrom. More particularly, the invention relates to the preparation of polyoxyalkylene polyether polyols by reacting an initiator compound or mixtures thereof with ethylene oxide in the presence of an alkaline catalyst and subsequently reacting the intermediate product with propylene oxide, butylene oxide or a heteric mixture selected from the group consisting of ethylene oxide, propylene oxide and butylene oxide, optionally followed by capping with either propylene oxide or butylene oxide.

2. Description of the Prior Art

The preparation of polyoxyalkylene polyether polyols is well known to those skilled in the art. It is also well known that a high oxyethylene content can have an effect on the physical properties of polyurethane foams. Generally the foams have closed cells. The prior art, however, is silent on the fact that a block of ethylene oxide constituting as much as 30 percent of the total molecule may be added to the initiator molecule without creating excessive amounts of closed cells in the polyurethane foam and, furthermore, can result in improved load bearing properties.

DESCRIPTION OF THE PREFERRED EMBODIMENT

The polyoxyalkylene polyether polyol having a hydroxyl number of about 20 to 200 and functionality of 2.5 to 8 comprises (a) an organic initiator compound or mixtures thereof having from 2 to 12 carbon atoms and 2 to 8 active hydrogen groups, and an equivalent weight ranging from about 30 to about 50, (b) an ethylene oxide adduct adjacent to the initiator comprising from 1 to 30 weight percent based on the total weight of the polyol, and (c) a subsequent alkylene oxide adduct selected from the group consisting of propylene oxide, butylene oxide and a heteric mixture of ethylene oxide and propylene oxide or ethylene oxide and butylene oxide provided that the total ethylene oxide content does not exceed 30 weight percent based on the weight of the polyol and optionally further provided that when a heteric mixture is employed, a further addition of propylene oxide is made to cap the product.

Preferably the concentration of ethylene oxide adduct at the initiation ranges from about 5 to about 20 weight percent based on the weight of the polyol.

Suitable alkylene oxides which may be employed have 2 to 4 carbon atoms in the alkylene chain and weights of 44 to 120, preferably 44 to 72, include ethylene oxide, 1,2- and 2,3-butylene oxide and 1,2-propylene oxide. Other oxides which may be employed include styrene oxide and cyclohexene oxide.

Possible initiator compounds include those with equivalent weights of 30 to 50, and which contain 2 to 8 Zerewitinoff-active hydrogen atoms. These include di- to pentafunctional polyamines and di- to octafunctional, preferably trifunctional, polyols. These include the following: ammonia, hydrazine, aliphatic and aromatic, possibly N-monoalkyl, N,N- and N,N'-dialkyl substituted diamines having 1 to 4 carbon atoms in the alkyl radical such as mono- and dialkyl-substituted ethylene diamine, diethylenetriamine, triethylenetetramine, 1,3-propylenediamine, 1,3- or 1,4-butylenediamine, 1,2-, 1,3-, 1,4- 1,5- and 1,6-hexamethylenediamine, phenylenediamine, 2,4- and 2,6-toluenediamine, and 4,4'-, 2,4'- and 2,2'-diaminodiphenylmethane; monoamines such as methylamine, ethylamine, isopropylamine, butylamine, benzylamine, aniline, the toluidines and naphthylamines; alkanolamines such as ethanolamine, diethanolamine, N-methyl- and N-ethyl-diethanolamine, N-methyl- and N-ethyl-diethanolamine and triethanolamine; water, glycerine, trimethylolpropane, triethylolethane, propylene glycol, dipropylene glycol, ethylene glycol, diethylene glycol, pentaerythritol, sorbitol, α-methylglucoside and sucrose.

Difunctional initiators are employed in mixture with higher functionality products to achieve a polyoxyalkylene polyether polyol functionality of 2.5 or greater. Preferred initiators are propylene glycol, glycerine and trimethylolpropane.

Commonly used catalysts include the alkali metal alkoxides having 1 to 4 carbon atoms in the alkyl radical such as sodium methylate, sodium and potassium ethylate, potassium isopropylate and sodium butylate, alkaline earth metal hydroxides such as calcium hydroxide and preferably alkali metal hydroxides such as lithium hydroxide and most preferably, sodium and potassium hydroxide.

The hydroxyl-group-containing polyoxyalkylene polyether polyols produced according to this invention have hydroxyl numbers of 20 to 200, preferably 25 to 80, and functionalities of 2.5 to 8.

The resulting crude product is treated to remove the residual catalyst by methods well known to those skilled in the art. These include neutralization with acids, filtration employing adsorbents such as magnesium silicate, water washing or ion exchange.

The polyurethane foams employed in the present invention are generally prepared by the reaction of the polyol of the invention with an organic polyisocyanate in the presence of a blowing agent and optionally in the presence of additional polyhydroxyl-containing components, chain-extending agents, catalysts, surface-active agents, stabilizers, dyes, fillers and pigments. Suitable processes for the preparation of cellular polyurethane plastics are disclosed in U.S. Pat. No. Re. 24,514 together with suitable machinery to be used in conjunction therewith. When water is added as the blowing agent, corresponding quantities of excess isocyanate to react with the water and produce carbon dioxide may be used. It is possible to proceed with the preparation of the polyurethane plastics by a prepolymer technique wherein an excess of organic polyisocyanate is reacted in a first step with the polyol of the present invention to prepare a prepolymer having free isocyanate groups which is then reacted in a second step with water and/or additional polyol to prepare a foam. Alternatively, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride, and methylene chloride may be used as blowing agents.

Organic polyisocyanates which may be employed include aromatic, aliphatic, and cycloaliphatic polyisocyanates and combinations thereof. Representative of these types are the diisocyanates such as m-phenylene diisocyanate, 2,4-toluene diisocyanate, 2,6-toluene diisocyanate, mixtures of 2,4- and 2,6-toluene diisocyanate, hexamethylene diisocyanate, tetramethylene diisocyanate, cyclohexane-1,4-diisocyanate, hexahydrotoluene diisocyanate (and isomers), naphthalene-1,5-diisocyanate, 1-methoxyphenyl-2,4-diisocyanate, 4,4'-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate and 3,3'-dimethyldiphenylmethane-4,4'-diisocyanate; the triisocyanates such as 4,4',4''-triphenylmethane triisocyanate, and toluene 2,4,6-triisocyanate; and the tetraisocyanates such as 4,4'-dimethyldiphenylmethane-2,2'-5,5'-tetraisocyanate and polymeric polyisocyanates such as polymethylene polyphenylene polyisocyanate. Especially useful due to their availability and properties are toluene diisocyanate, 4,4'-diphenylmethane diisocyanate and polymethylene polyphenylene polyisocyanate.

Crude polyisocyanates may also be used in the compositions of the present invention, such as crude toluene diisocyanate obtained by the phosgenation of a mixture of toluene diamines or crude diphenylmethane isocyanate obtained by the phosgenation of crude diphenylmethane diamine. The preferred or crude isocyanates are disclosed in U.S. Pat. No. 3,215,652.

Chain-extending agents which may be employed in the preparation of the polyurethane foams include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water, ethylene glycol, 1,4-butanediol and primary and secondary diamines which react more readily with the prepolymer than does water such as phenylene diamine, 1,4-cyclohexane-bis-(methylamine), ethylenediamine, diethylenetriamine, N-(2-hydroxypropy)ethylenediamine, N,N'-di(2-hydroxypropyl)ethylenediamine, piperazine, and 2-methylpiperazine.

Any suitable catalyst may be used including tetriary amines such as, for example, triethylenediamine, N-methylmorpholine, N-ethylmorpholine, diethylethanolamine, N-cocomorpholine, 1-methyl-4-dimethylaminoethylpiperazine, 3-methoxypropyldimethylamine, N,N,N'-trimethylisopropyl propylenediamine, 3-diethylaminopropyldiethylamine, dimethylbenzylamine, and the like. Other suitable catalysts are, for example, stannous chloride, dibutyltin di-2-ethyl hexanoate, stannous oxide, as well as other organometallic compounds such as are disclosed in U.S. Pat. No. 2,846,408.

A surface-active agent is generally necessary for production of high grade polyurethane foam according to the present invention, since in the absence of same, the foams collapse or contain very large uneven cells. Numerous surface-active agents have been found satisfactory. Nonionic surface active agents are preferred. Of these, the nonionic surface-active agents such as the well-known silicones have been found particularly desirable. Other surface-active agents which are operative, although not preferred, include polyethylene glycol ethers of long chain alcohols, tertiary amine or alkanolamine salts of long chain alkyl acid sulfate esters, alkyl sulfonic esters, and alkyl arylsulfonic acids.

In the preparation of the flame retardant polyurethane foam products the flame retardants which may be employed are: pentabromodiphenyl oxide, dibromopropanol, tris($\beta$-chloropropyl)phosphate, 2,2-bis(-bromoethyl) 1,3-propanediol, tetrakis(2-chloroethyl)ethylene diphosphate, tris(2,3-dibromopropyl)phosphate, tris($\beta$-chloroethyl)phoshate, tris(1,2-dichloropropyl)phosphate, bis-(2-chloroethyl) 2-chloroethylphosphonate, molybdenum trioxide, ammonium molybdate, ammonium phosphate, pentabromodiphenyloxide, tricresyl phosphate, hexabromocyclododecane and dibromoethyl-dibromocyclohexane. The concentrations of flame retardant compounds which may be employed range from 5 to 25 parts per 100 parts of polyol mixture.

The following examples illustrate the nature of the invention. All parts are by weight unless otherwise stated. In the examples, the physical properties of the polyurethane foam were determined by the following ASTM tests:
Density-D1622-63
Tensile Strength-D1623-72
Elongation-D412
Split Tear-D470
Compression Set-D395
Compression Load-D1564
Humid Aging-D1564

The following abbreviations are employed in the examples below:
Dabco 33 LV TM -33 percent solution of triethylenediamine in dipropylene glycol
Silicone L-520 TM -a silicone surfactant
Catalyst T-9 TM -stannous octoate
E.O.-ethylene oxide
P.O.-propylene oxide
TDI-toluene diisocyanate, 80/20, 2,4- 2,6-isomers

EXAMPLES 1-10

Procedure

The indicated amounts in the tables below of glycerine and 45 percent potassium hydroxide were charged to a reactor equipped with a stirrer, heating means, and nitrogen inlet and the water was stripped off. This was followed by the addition of ethylene oxide, propylene oxide or propylene glycol as indicated, and the mixture was allowed to react at about 105° C. over a total time period of 7 to 8 hours under nitrogen pressure. The reaction mixture was vented and additional charges of potassium hydroxide were made followed by stripping off the water. Ethylene oxide and propylene oxide additions were then made and the mixture allowed to react at 105° C. for an additional 7 to 8 hours. This procedure was repeated with additional oxide charges. After the reaction was completed, the product was filtered to remove the catalyst, stripped at 105° C. for 1 hour and discharged from the reactor.

TABLE I

| | Example | | | |
|---|---|---|---|---|
| | 1 | 2 | 3 | 4 |
| Charge, pbw | | | | |
| Glycerine | 915 | 1657 | 244 | 221 |
| 45% KOH | 5.5 | 4.0 | 95 | 67 |
| Propylene Glycol | — | — | — | 27 |
| E.O. | 1500 | 3000 | — | — |
| P.O. | — | — | 356 | 352 |
| 2nd Charge, pbw | | | | |
| 45% KOH | 350 | 500 | | |
| Propylene Glycol | — | 202 | | |
| E.O. | | | 480* | — |

TABLE I-continued

| | Example | | | |
|---|---|---|---|---|
| | 1 | 2 | 3 | 4 |
| P.O. | | | | |
| 3rd Charge, pbw | | | | |
| P.O. | | | 7000* | 7480 |
| Hydroxyl No. | 722 | 664 | 57.6 | 57.6 |

TABLE II

| | Example | | |
|---|---|---|---|
| | 5 | 6 | 7 |
| Charge, pbw | | | |
| Polyol of Example 1 | 252 | 252 | 252 |
| E.O. | — | 150 | 300 |
| 2nd Charge, pbw* | | | |
| E.O. | 171 | 162 | 152 |
| P.O. | 2618 | 2477 | 2337 |
| Hydroxyl No. | 57.6 | 58.4 | 56.7 |
| Unsaturation | 0.025 | 0.021 | 0.019 |
| Acid No. | 0.003 | 0 | 0.04 |
| Alkalinity, as ppm K | 7.0 | 10 | 7 |
| % E.O. at Initiator | 5 | 10 | 15 |
| Total % E.O. | 11 | 16 | 21 |

*This charge was a mixture of E.O. and P.O.

TABLE III

| | Example | | |
|---|---|---|---|
| | 8 | 9 | 10 |
| Charge, pbw | | | |
| Polyol of Example 2 | 502 | 502 | 502 |
| E.O. | — | 300 | 600 |
| 2nd Charge, pbw | | | |
| P.O. | 5574 | 5274 | 4974 |
| Hydroxyl No. | 58.6 | 58.8 | 57.4 |
| Unsaturation | 0.032 | 0.032 | 0.031 |
| Acid No. | 0.002 | 0.002 | 0 |
| Alkalinity, as ppm K | 2 | 4 | 5 |
| % E.O. at Initiator | 5 | 10 | 15 |

EXAMPLES 11-19

The indicated amounts of polyol, water, Dabco 33LV and Silicone L-520 were added in a suitable container and mixed for about 30 seconds. Catalyst T-9 was added and the mixture was stirred for 15 seconds. TDI was then added, the mixture was stirred for 5 to 10 seconds and poured into suitable containers. After the foam had formed, it was cured in an oven at 115° C. for 5 to 10 minutes. Physical properties were then determined.

TABLE IV

| | Example | | | | |
|---|---|---|---|---|---|
| | 11 | 12 | 13 | 14 | 15 |
| Polyol of Example | 3 | 5 | 6 | 6 | 7 |
| Percent Oxyethylene at initiator | 0 | 5 | 10 | 10 | 5 |
| Charge, pbw | | | | | |
| Polyol | 250 | 250 | 250 | 250 | 250 |
| Water | 10 | 10 | 10 | 10 | 10 |
| DABCO 33 LV | 0.75 | 0.75 | 0.75 | 0.75 | 0.75 |
| Silicone L-520 | 2.5 | 2.5 | 2.5 | 2.5 | 2.5 |
| Catalyst T-9 | 0.26 | 0.26 | 0.26 | 0.22 | 0.22 |
| TDI Index | 110 | 110 | 110 | 110 | 110 |
| Rise time, sec. | 115 | 115 | 95 | 80 | 110 |
| Physical Properties | | | | | |
| Density, pcf | 1.63 | 1.63 | 1.64 | 1.64 | 1.60 |
| Tensile Strength, psi | 11.8 | 11.3 | 11.5 | 11.7 | 10.5 |
| Percent Elongation | 150 | 133 | 150 | 117 | 150 |
| Tear, PI | 2.2 | 1.8 | 2.0 | 2.0 | 1.7 |
| I.L.D. (lb/in²) | | | | | |
| Sample thickness (in.) | 4.04 | 4.04 | 4.04 | 4.04 | 4.04 |
| Load at 25% deflection | 32.0 | 34.0 | 36.4 | 35.4 | 39.6 |
| Load at 65% deflection | 62.0 | 62.8 | 68.4 | 68.0 | 70.6 |
| Load at 25% return | 22.0 | 22.2 | 24.4 | 24.2 | 25.0 |
| Sag Factor | 1.94 | 1.85 | 1.88 | 1.92 | 1.78 |
| Guide Factor | 19.6 | 20.9 | 22.2 | 21.6 | 24.7 |
| Percent Recovery | 68.8 | 65.3 | 67.0 | 68.4 | 63.1 |
| C.L.D., psi | | | | | |
| Load at 25% deflection | | | | | |
| Load at 50% deflection | 0.50 | 0.55 | 0.59 | 0.55 | 0.53 |
| Load at 65% deflection | | | | | |
| Compression Sets | | | | | |
| % set at 50% compression | 7.6 | 8.6 | 6.5 | 6.2 | 5.8 |
| % set at 90% compression | 6.3 | 8.0 | 7.4 | 7.7 | 7.5 |
| Air flow, CFM at 0.5" H₂O | 5.60 | 5.50 | 3.30 | 4.20 | 5.10 |

TABLE V

| | Example | | | |
|---|---|---|---|---|
| | 16 | 17 | 18 | 19 |
| Polyol of Example | 4 | 8 | 9 | 10 |
| Percent Oxyethylene at initiator | 0 | 5 | 10 | 15 |
| Charge, pbw | | | | |
| Polyol | 250 | 250 | 250 | 250 |
| Water | 10 | 10 | 10 | 10 |
| DABCO 33 LV | 0.75 | 0.75 | 0.75 | 0.75 |
| Silicone L-520 | 2.5 | 2.5 | 2.5 | 2.5 |
| Catalyst T-9 | 0.26 | 0.26 | 0.26 | 0.26 |
| TDI Index | 110 | 110 | 110 | 110 |
| Rise time, sec. | 130 | 118 | 110 | 108 |
| Physical Properties | | | | |
| Density, pcf | 1.58 | 1.60 | 1.59 | 1.60 |
| Tensile Strength, psi | 13.7 | 11.9 | 11.3 | 10.3 |
| Percent Elongation | 160 | 150 | 143 | 123 |
| Tear, PI | 1.7 | 1.8 | 1.8 | 1.9 |
| I.L.D. (lb/in²) | | | | |
| Sample thickness (in.) | 4.12 | 4.06 | 4.07 | 4.07 |
| Load at 25% deflection | 29.4 | 35.6 | 38.0 | 37.8 |
| Load at 65% deflection | 62.8 | 71.0 | 72.0 | 69.8 |
| Load at 25% return | 20.2 | 24.0 | 25.4 | 24.8 |
| Sag Factor | 2.14 | 1.99 | 1.89 | 1.85 |
| Guide Factor | 18.6 | 22.2 | 24.0 | 23.7 |
| Percent Recovery | 68.7 | 67.4 | 66.8 | 65.6 |
| C.L.D., psi | | | | |
| Load at 25% deflection | | | | |
| Load at 50% deflection | 0.51 | 0.51 | 0.54 | 0.54 |
| Load at 65% deflection | | | | |
| Compression Sets | | | | |
| % set at 50% compression | 9.2 | 8.6 | 7.2 | 8.5 |
| % set at 90% compression | 10.3 | 8.7 | 8.2 | 8.9 |
| Air flow, CFM at 0.5" H₂O | 4.80 | 5.00 | 4.50 | 3.30 |

EXAMPLES 20-29

The procedure employed for the preparation of the polyols of Examples 20-29 was similar to that of Examples 1-10.

TABLE VI

| | Example | |
|---|---|---|
| | 20 | 21 |
| Charge, pbw | | |
| Glycerine | 906 | — |
| TMP | — | 1235 |
| 45% KOH | 27 | 27 |
| Ethylene Oxide | 4969 | 4648 |
| 2nd Charge, g. | | |
| 45% KOH | 382 | 356 |
| E.O. addition time, hr. | 9.9 | 11.5 |
| Reaction time, hr. | 1.0 | 1.0 |
| Hydroxyl No. | 277 | 258 |

TABLE VII

| | Example | | | | | | | |
|---|---|---|---|---|---|---|---|---|
| | 22 | 23 | 24 | 25 | 26 | 27 | 28 | 29 |
| Charge, pbw | | | | | | | | |
| Polyol of Example 20 | 1048 | 1048 | 1048 | 1048 | — | — | — | — |
| Polyol of Example 21 | — | — | — | — | 1120 | 1120 | 1120 | 1120 |
| E.O. | — | 333 | 633 | 933 | — | 332 | 632 | 932 |
| P.O. | 5031 | — | — | — | 4959 | — | — | — |
| Oxide addition time, hr. | 8.2 | 0.8 | 2.0 | 3.2 | 8.0 | 1.0 | .9 | 2.9 |
| 2nd Charge, P.O. | — | 4698 | 4398 | 4098 | — | 4627 | 4327 | 4027 |
| P.O. addition time, hr. | — | 8.2 | 7.2 | 6.0 | — | 8.1 | 7.1 | 6.4 |

EXAMPLES 30-37

The procedure and formulation employed in Examples 11-19 were employed for the preparation of the foams of Examples 30-37 with the exception of the polyols as indicated in Tables VIII and XI. The foam properties indicate that employing polyols having an oxyethylene structure located as a block at the initiator resulted in a faster rise time, higher ILD without excessive closed cells as indicated air flow.

TABLE VIII

| | Example | | | |
|---|---|---|---|---|
| | 30 | 31 | 32 | 33 |
| Polyol of Example | 22 | 23 | 24 | 25 |
| Density, pcf | 1.57 | 1.64 | 1.59 | 1.62 |
| Tensile Strength, psi | 12.5 | 11.1 | 13.5 | 14.5 |
| % Elongation | 140 | 107 | 132 | 140 |
| Tear (PI) | 2.4 | 2.5 | 2.2 | 1.9 |
| I.L.D. (lb/50 sq. in.) | | | | |
| Sample thickness (inches) | 4.00 | 4.00 | 4.00 | 4.00 |
| Load at 25% deflection | 36.0 | 38.5 | 45.2 | 43.8 |
| Load at 65% deflection | 70.5 | 74.5 | 80.8 | 80.0 |
| Load at 25% return | 25.0 | 27.0 | 32.5 | 30.6 |
| Sag Factor | 1.96 | 1.94 | 1.79 | 1.83 |
| Guide Factor | 22.9 | 23.5 | 28.3 | 27.1 |
| % Recovery | 69.4 | 70.1 | 71.9 | 69.9 |
| C.L.D. (psi) | | | | |
| Load at 50% deflection | .56 | .56 | .65 | .64 |
| Compression Sets | | | | |
| % set at 50% compression | 4.4 | 4.7 | 5.6 | 6.6 |
| % set at 90% compression | 4.7 | 4.3 | 4.8 | 8.0 |
| Air Flow, cfm at .5 inch water | 6.00 | 5.40 | 2.30 | .30 |

TABLE IX

| | Example | | | |
|---|---|---|---|---|
| | 34 | 35 | 36 | 37 |
| Polyol of Example | 26 | 27 | 28 | 29 |
| Density, pcf | 1.73 | 1.74 | 1.75 | 1.76 |
| I.L.D. (lb/50 sq. in.) | | | | |
| Sample thickness (inches) | 4.00 | 4.00 | 4.00 | 4.00 |
| Load at 25% deflection | 37.0 | 38.8 | 40.6 | 41.3 |
| Load at 65% deflection | 71.2 | 71.2 | 76.9 | 79.9 |
| Load at 25% return | 25.5 | 26.0 | 27.4 | 29.7 |
| Sag Factor | 1.92 | 1.84 | 1.89 | 1.93 |
| Guide Factor | 21.4 | 22.3 | 23.2 | 23.5 |
| % Recovery | 68.9 | 67.0 | 67.5 | 71.9 |
| C.L.D. (psi) | | | | |
| Load at 50% deflection | .63 | .60 | .62 | .65 |
| Compression Sets | | | | |
| % set at 50% compression | 2.7 | 3.4 | 3.3 | 5.7 |
| % set at 90% compression | 4.2 | 3.9 | 4.7 | 5.3 |
| Air Flow, cfm at .5 inch water | 5.40 | 6.00 | 5.30 | 2.69 |

The embodiments of the invention in which an exclusive privilege or property is claimed are defined as follows:

1. A polyoxyalkylene polyether polyol having a hydroxyl number of about 20 to 200 and functionality of 2.5 to 8 comprising the reaction product of
    (a) an organic initiator compound having from 2 to 8 active hydrogen groups and 2 to 12 carbon atoms and an equivalent weight ranging from about 30 to about 50,
    (b) an ethylene oxide adduct adjacent to the initiator comprising from 1 to 30 weight percent based on the total weight of the polyol, and
    (c) a subsequent alkylene oxide adduct selected from the group consisting of propylene oxide, butylene oxide and a heteric mixture of ethylene oxide and propylene oxide provided that the ethylene oxide content does not exceed 30 weight percent based on the weight of the polyol and further provided that when the heteric mixture is employed a further addition of propylene oxide is made to cap the product.

2. The polyol of claim 1 wherein the initiator is selected from the group consisting of propylene glycol, glycerine, and trimethylolpropane.

3. The polyol of claim 1 wherein the concentration of ethylene oxide at the initiator ranges from about 5 to about 15 weight percent based on the weight of the polyol.

4. A process for the preparation of a polyoxyalkylene polyether polyol having a hydroxyl number of about 20 to 200 and functionalities of 2.5 to 8 comprising the steps of reacting
    (a) an organic initiator compound having from 2 to 8 active hydrogen groups, 2 to 12 carbon atoms and an equivalent weight ranging from 30 to 50,
    (b) ethylene oxide in an amount from 1 to 20 weight percent based on the total weight of the polyol, and
    (c) alkylene oxide selected from the group consisting of propylene oxide, butylene oxide and a mixture of ethylene oxide and propylene oxide provided that the total ethylene oxide content does not exceed 30 weight percent based on the weight of the polyol, in the presence of a catalyst.

5. The process of claim 4 wherein the initiator is selected from the group consisting of propylene glycol, glycerine, and trimethylolpropane.

6. The process of claim 4 wherein the concentration of ethylene oxide at the initiator ranges from about 5 to about 15 weight percent based on the weight of the polyol.

7. A flexible polyurethane foam prepared by reacting an organic polyisocyanate with the polyoxyalkylene polyether polyol of claim 1.

8. A flexible polyurethane foam prepared by reacting an organic polyisocyanate with the polyoxyalkylene polyether polyol of claim 2.

9. A flexible polyurethane foam prepared by reacting an organic polyisocyanate with the polyoxyalkylene polyether polyol of claim 3.

* * * * *